United States Patent
Tanigawa et al.

[11] Patent Number: 5,811,511
[45] Date of Patent: Sep. 22, 1998

[54] METHOD FOR STABILIZING UNSTABLE TERMINALS OF AN OXYMETHYLENE COPOLYMER

[75] Inventors: Yukio Tanigawa; Hirohisa Morishita, both of Kurashiki, Japan

[73] Assignee: Asahi Kasei Kogyo Kabushiki Kaisha, Osaka, Japan

[21] Appl. No.: 702,569

[22] PCT Filed: Mar. 22, 1995

[86] PCT No.: PCT/JP95/00530

§ 371 Date: Aug. 7, 1996

§ 102(e) Date: Aug. 7, 1996

[87] PCT Pub. No.: WO95/25761

PCT Pub. Date: Sep. 28, 1995

[30] Foreign Application Priority Data

Mar. 22, 1994 [JP] Japan ................................ 6-073742

[51] Int. Cl.$^6$ ........................................ C08G 2/00
[52] U.S. Cl. ........................ 528/230; 528/270; 528/480; 528/502; 528/503; 525/398; 264/211.12; 264/211.18; 264/211.2
[58] Field of Search .................... 528/230, 270, 528/480, 502, 503; 525/398; 264/211.12, 211.18, 211.2

[56] References Cited

U.S. PATENT DOCUMENTS 4,366,305 12/1982 Amemiya et al. .

FOREIGN PATENT DOCUMENTS

| 0 088 541 | 9/1983 | European Pat. Off. . |
| 58-11450 | 3/1983 | Japan . |
| 58-152012 | 9/1983 | Japan . |
| 61-209216 | 9/1986 | Japan . |
| 3-109411 | 5/1991 | Japan . |

*Primary Examiner*—Duc Truong
*Attorney, Agent, or Firm*—Pennie & Edmonds LLP

[57] ABSTRACT

Disclosed is a method for stabilizing unstable terminals of a crude oxymethylene copolymer, wherein use is made of an extruder comprising a casing having a supply inlet and an extrusion outlet which casing has at least two rotation shafts extending longitudinally through the extruder in which a melting zone, a terminal stabilization reaction zone and a volatile matter exhaustion zone are consecutively arranged from the supply inlet toward the extrusion outlet, wherein the terminal stabilization zone has a plurality of kneading elements having a thickness of from 0.1D to 0.3D (wherein D represents the inner diameter of the casing of the extruder) arranged longitudinally on and securely attached to each rotation shaft in a region thereof having a length of from 2D to 15D (wherein D is as defined above), and wherein the molten crude oxymethylene copolymer is kneaded and agitated, in the presence of a basic substance capable of decomposing unstable terminals of the crude oxymethylene copolymer, in the terminal stabilization reaction zone of the extruder, thereby decomposing the unstable terminals of the crude oxymethylene copolymer. By the method of the present invention, the terminal stabilization reaction of a crude oxymethylene copolymer can be efficiently performed to a substantially complete degree in a short period of time.

5 Claims, 4 Drawing Sheets

METHOD FOR STABILIZING UNSTABLE TERMINALS OF AN OXYMETHYLENE COPOLYMER

BACKGROUND OF THE INVENTION

1. Technical Field

The present invention relates to a method for stabilizing unstable terminals of an oxymethylene copolymer. More particularly, the present invention is concerned with a method for stabilizing unstable terminals of a crude oxymethylene copolymer, wherein use is made of an extruder comprising a casing having a supply inlet and an extrusion outlet which casing has at least two rotation shafts extending longitudinally through the extruder in which a melting zone, a terminal stabilization reaction zone and a volatile matter exhaustion zone are consecutively arranged from the supply inlet toward the extrusion outlet, wherein the terminal stabilization zone has a plurality of kneading elements having a specific thickness arranged longitudinally on and securely attached to each rotation shaft in a region thereof having a specific length, and wherein the molten crude oxymethylene copolymer is kneaded and agitated, in the presence of a basic substance capable of decomposing unstable terminals of the crude oxymethylene copolymer, in the terminal stabilization reaction zone of the extruder, thereby decomposing the unstable terminals of the crude oxymethylene copolymer. By the method of the present invention, the terminal stabilization reaction of a crude oxymethylene copolymer can be efficiently performed to a substantially complete degree in a short period of time.

2. Background Art

A crude oxymethylene copolymer which is produced by copolymerizing trioxane with a cyclic ether has a group —(OCH$_2$)$_n$—OH at its molecular chain terminals. This terminal group —(OCH$_2$)$_n$—OH needs to be stabilized because it is thermally unstable. As methods for stabilizing this crude oxymethylene copolymer, there are known a method of acetylating, etherifying or urethanizing the terminals of the crude copolymer, and a method of decomposing the unstable terminals of the crude copolymer. Of these above-mentioned methods, the decomposition of the unstable terminals is advantageously used for stabilizing the crude oxymethylene copolymer. As methods for decomposing the unstable terminals to stabilize the crude oxymethylene copolymer, there are known a method of heating the crude oxymethylene copolymer in water or an organic solvent in the presence of a basic substance capable of decomposing the unstable terminals, and a method of stabilizing a crude oxymethylene copolymer in a molten form. The former requires various operations, such as operations for separation, recovery and washing of the treated copolymer. Whereas, the latter is commercially advantageous since a stabilized copolymer can be directly obtained.

With respect to the conventionally known methods of treating a crude oxymethylene copolymer in a molten form to decompose unstable terminals thereof, there can be mentioned Examined Japanese Patent Application Publication No. 58-11450 (corresponding to U.S. Pat. No. 4,366,305), which discloses a method for stabilizing the unstable terminals of a crude oxymethylene copolymer by use of a special, surface-renewing mixer, after a heat treatment of the crude copolymer. In this method, a degassing apparatus which comprises in combination an extruder and a surface-renewing mixer having a plurality of scraping blades is used. The method consists in heat-melting the crude oxymethylene copolymer and kneading the crude copolymer in a molten state under a reduced pressure for a residence time of from 5 to 60 minutes, while constantly renewing the surface of the crude copolymer and volatilizing the volatiles contained in the crude copolymer, to thereby decompose the unstable terminals of the crude copolymer.

Further, another method for stabilizing unstable terminals of a crude oxymethylene copolymer, and apparatus for practicing the method are disclosed in Unexamined Japanese Patent Application Laid-Open Specification No. 58-152012 (corresponding to European Patent 0 088 541). The method comprises melting the crude oxymethylene copolymer in a single screw extruder, decomposing unstable terminals of the crude copolymer in a static mixer having a reaction zone connected to the output of the extruder by mixing, by the principle of flow division and rearrangement, the crude copolymer and a reactant comprising water and/or an organic hydroxy-containing compound and an alkaline material soluble in water or in the organic hydroxy-containing compound, and removing volatile side products in a vented screw extruder arranged immediately after the static mixer.

Further, Unexamined Japanese Patent Application Laid-Open Specification No. 62-129311 discloses a method in which a crude oxymethylene copolymer in powdery or granular form is heat-treated in an in-vacuo drying apparatus at a temperature which is 5° to 35° C. lower than the melting point of the crude copolymer, and subsequently heat-melted in an extruder.

However, the above-mentioned conventional methods have the following problems.

In the method disclosed in Examined Japanese Patent Application Publication No. 58-11450, the oxymethylene copolymer is kneaded for a time as long as 5 to 60 minutes after being heat-melted and, therefore, thermal decomposition and discoloration of the copolymer are likely to occur, thus lowering the quality of the treated copolymer. Further, this method requires a complicated apparatus comprising in combination an extruder and a surface-renewing mixer. In addition, the apparatus needs to be large because the treatment must be conducted for a long period of time. Therefore, this method is not desirable from a commercial point of view.

In the method disclosed in Unexamined Japanese Patent Application Laid-Open Specification No. 58-152012, independent apparatuses are separately used for conducting each of the melting, terminal stabilization, and volatilization operations. A system using such separate apparatus for practicing the method becomes complicated and large. Therefore, this method also is not advantageous from a commercial point of view.

In the method disclosed in Unexamined Japanese Patent Application Laid-Open Specification No. 62-129311, the treated oxymethylene copolymer has still remaining unstable terminals in an amount as high as 4000 ppm by weight or more. Therefore, the thermal stability of the obtained oxymethylene copolymer is unsatisfactory. In addition, a problem occurs such that unpleasant smell is generated during the molding of the copolymer due to formaldehyde produced by decomposition of the remaining unstable terminals. Further, the use of a large drying apparatus as well as an extruder is necessary. Therefore, this method also is not advantageous from a commercial point of view.

SUMMARY OF THE INVENTION

In these situations, the present inventors have made extensive and intensive studies with a view toward developing a commercially advantageous method for stabilizing unstable terminals of a crude oxymethylene copolymer, which method can solve the difficult problems accompanying the above-mentioned prior art methods. As a result, it has been found that a stabilized oxymethylene copolymer which has high thermal stability and which is unlikely to suffer discoloration of the copolymer and unpleasant smell of formaldehyde generated during the molding of the copolymer can be obtained by treating a crude oxymethylene copolymer in accordance with a method, wherein use is made of an extruder comprising a casing having a supply inlet and an extrusion outlet which casing has at least two rotation shafts extending longitudinally through the extruder in which a melting zone, a terminal stabilization reaction zone and a volatile matter exhaustion zone are consecutively arranged from the supply inlet toward the extrusion outlet, wherein the terminal stabilization zone has a plurality of kneading elements having a thickness of from 0.1D to 0.3D (wherein D represents the inner diameter of the casing of the extruder) arranged longitudinally on and securely attached to each rotation shaft in a region thereof having a length of from 2D to 15D (wherein D is as defined above), and wherein the molten crude oxymethylene copolymer is kneaded and agitated, in the presence of a basic substance capable of decomposing unstable terminals of the crude oxymethylene copolymer, in the terminal stabilization reaction zone of the extruder, thereby decomposing the unstable terminals of the crude oxymethylene copolymer.

The present invention has been completed, based on the above finding.

Accordingly, it is an object of the present invention to provide a commercially advantageous method for stabilizing unstable terminals of a crude oxymethylene copolymer, which is capable of obtaining a stabilized oxymethylene copolymer having high thermal stability and suffering substantially no thermal decomposition or substantially no discoloration of the copolymer.

The foregoing and other objects, features and advantages of the present invention will be apparent from the following detailed description and appended claims, taken in connection with the accompanying drawings.

BRIEF DESCRIPTION OF THE DRAWINGS

In the accompanying drawings:

FIG. 2(a) is a diagrammatic side view of two kneading elements which are adjacent to each other among a plurality of kneading elements securely attached to the rotation shaft in a predetermined region of the terminal stabilization reaction zone in the extruder shown in FIG. 1;

FIG. 2(b) is a view of the two kneading elements as viewed from the right-hand side in FIG. 2(a), showing the angularly staggered relationship between the two kneading elements;

FIG. 3(a) is a diagrammatic, partial perspective view showing the arrangement of a set of kneading elements on each of a pair of rotation shafts rotating in the same direction in the casing of the extruder, wherein each kneading element has a quasi triangular cross-section taken along a plane perpendicular to the axis of the rotation shaft, and wherein the set of kneading elements is arranged in adjacent relationship to a set of screw elements;

FIGS. 3(b) to 3(d) are explanatory diagrams showing the rotation of a couple of kneading elements respectively attached to the pair of rotation shafts as shown in FIG. 3(a), shown with a crude oxymethylene copolymer in a molten state which is kneaded and agitated by the couple of kneading elements in accordance with the rotation of the rotation shafts;

FIG. 4(a) is a diagrammatic, partial perspective view which is similar to FIG. 3(a), wherein each kneading element has a convex lens-shaped cross-section taken along a plane perpendicular to the axis of the rotation shaft; and FIGS. 4(b) to 4(d) are explanatory diagrams similar to FIGS. 3(b) to 3(d), wherein each kneading element has a convex lens-shaped cross-section taken along a plane perpendicular to the axis of the rotation shaft.

In FIGS. 1 through 4(d), like parts or portions are designated by like numerals. The reference numerals have the following meanings.

1: Melting zone

2: Terminal stabilization reaction zone

3: Volatile matter exhaustion zone

Figure 1:
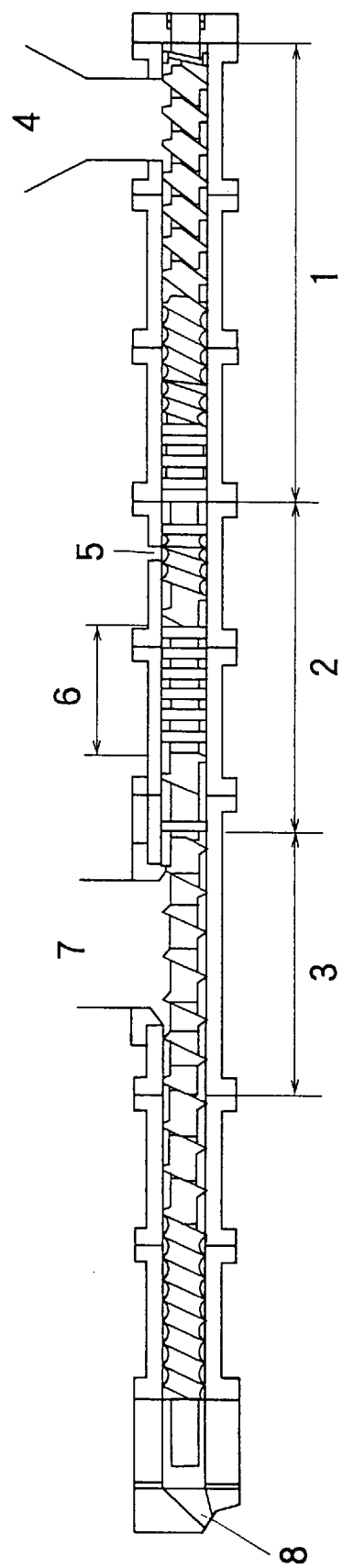
FIG. 1 is an explanatory diagrammatic side view showing the internal structure of one form of an extruder to be used in the method of the present invention, and showing how a melting zone, a terminal stabilization reaction zone, and a volatile matter exhaustion zone are arranged.

4: Supply inlet for a crude oxymethylene copolymer

5: Inlet for a basic substance

6: Region having kneading elements

7: Vent

8: Extrusion outlet for a stabilized oxymethylene copolymer

9: Kneading element (having a convex lens-shaped cross-section)

10: The nearest kneading element (having a convex lens-shaped cross-section) which is longitudinally adjacent to kneading element 9 on a side of the extrusion outlet 11: A part of a region in which a set of screw elements is securely attached to each of a pair of rotation shafts 12: A part of a region in which a set of kneading elements is securely attached to each of a pair of rotation shafts 13: Casing 14, 14': Kneading element 15, 15': Axis of the rotation shaft 16, 16': Rotation direction of the rotation shaft 17: Crude oxymethylene copolymer in a molten state 18, 18': Direction of kneading and agitating of a crude oxymethylene copolymer in a molten state

DETAILED DESCRIPTION OF THE INVENTION

According to the present invention, there is provided a method for stabilizing unstable terminals of a crude oxymethylene copolymer to produce a stabilized oxymethylene copolymer, which comprises:

(1) feeding a crude oxymethylene copolymer to a supply inlet of an extruder comprising a melting zone, a terminal stabilization reaction zone and a volatile matter exhaustion zone which are consecutively arranged in the extruder from the supply inlet toward an extrusion outlet for a stabilized oxymethylene copolymer, each of the zones being kept at a temperature of from the melting temperature of the crude oxymethylene copolymer to 265° C.
thereby melting the crude oxymethylene copolymer in the melting zone,
the extruder comprising a horizontally extending casing which has at least two rotation shafts extending longitudinally through the extruder, each rotation shaft comprising a first portion corresponding to the melting zone, a second portion corresponding to the terminal stabilization reaction zone, and a third portion corresponding to the volatile matter exhaustion zone, (2) transporting the crude oxymethylene copolymer melted in the melting zone to the terminal stabilization reaction zone, and kneading and agitating the molten crude oxymethylene copolymer, in the presence of a basic substance capable of decomposing unstable terminals of the crude oxymethylene copolymer in the terminal stabilization reaction zone corresponding to the second portion of each rotation shaft, the second portion of each rotation shaft having a plurality of kneading elements arranged longitudinally thereon and securely attached thereto in a region thereof having a length of from 2D to 15D wherein D represents the inner diameter of the casing of the extruder, each kneading element comprising two surfaces separated by a distance equal to a thickness of the kneading element, each of the two surfaces being substantially perpendicular to a longitudinal axis of the rotation shaft, wherein the thickness of the kneading element is from 0.1D to 0.3D in which D is as defined above, thereby performing a terminal stabilization reaction of the crude oxymethylene copolymer with the basic substance to thereby decompose the unstable terminals of the crude oxymethylene copolymer and produce a stabilized oxymethylene copolymer;

(3) transporting the stabilized oxymethylene copolymer to the volatile matter exhaustion zone to remove a generated gas of a volatile by-product; and (4) withdrawing the stabilized oxymethylene copolymer through the extrusion outlet therefor.

The method of the present invention will be described below in detail.

A crude oxymethylene copolymer to be used in the method of the present invention is produced by copolymerizing trioxane as a main monomer with a cyclic ether as a comonomer copolymerizable therewith. The copolymerization reaction can be performed, for example, by bulk polymerization. The bulk polymerization may be conducted in either a batchwise or a continuous manner. In general, such a bulk polymerization is conducted using monomers in a molten form, to thereby produce a solid copolymer in bulk form as the polymerization progresses.

The cyclic ether to be used as a comonomer for producing a crude oxymethylene copolymer to be used in the method of the present invention can be represented by the formula (I):

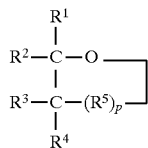
(I)

wherein each of $R^1$ to $R^4$ independently represents a hydrogen atom, a $C_1$–$C_5$ alkyl group which is unsubstituted or substituted with 1 to 3 halogen atoms, and each $R^5$ independently represents a methylene or oxymethylene group, which is unsubstituted or substituted with 1 or 2 $C_1$–$C_5$ alkyl groups or 1 or 2 halogen atoms (in this case, p represents an integer of from 0 to 3), or each $R^5$ independently represents a bivalent group represented by formula (II) or (III):

[in this case, p in formula (I) is 1, and q in formula (II) or (III) represents an integer of from 1 to 4].

Representative examples of cyclic ethers represented by formula (I) above include ethylene oxide, propylene oxide, 1,3-dioxolane, 1,3,5-trioxepane, 1,4-butanediol formal, epichlorohydrin and diglycol formal. Of these, a cyclic formal, such as 1,3-dioxolane, 1,3,5-trioxepane, or 1,4-butanediol formal, is preferred as a comonomer to be used for producing a crude oxymethylene copolymer to be used in the method of the present invention. 1,3-Dioxolane and 1,4-butanediol formal are especially preferred. The cyclic ether as a comonomer is used in an amount of from 0.02 to 15 mol %, preferably from 0.1 to 10 mol %, based on the amount of the trioxane.

Examples of polymerization catalysts to be used in the above-mentioned copolymerization reaction include boron trifluoride, boron trifluoride hydrate, and coordination compounds of an oxygen- or sulfur-containing organic compound with boron trifluoride, which may be either in gaseous form or in the form of a solution thereof in a suitable organic solvent. Of the above polymerization catalysts, the coordination compounds of an oxygen- or sulfur-containing organic compound with boron trifluoride, specifically, boron trifluoride diethyl ether and boron trifluoride dibutyl ether, are especially preferred. With respect to the amount of the polymerization catalyst, the catalyst is used in an amount of from $1\times10^{-6}$ to $1\times10^{-3}$ mol, preferably $5\times10^{-6}$ to $1\times10^{-4}$ mol per mol of the total of the trioxane and cyclic ether.

When the above-mentioned polymerization catalyst is used in an amount exceeding $1\times10^{-3}$ mol per mol of the total of the trioxane and cyclic ether, a hydride shift reaction (see, for example, H. D. Herman, E. Fisher, K. Weissermel, Macromol Chem., 90, p. 1, 1966) is likely to occur as a side reaction during the copolymerization, so that the amount of the terminal methoxyl or formate groups formed is increased, leading to a difficulty in producing a crude oxymethylene copolymer having a high molecular weight. When the hydride shift reaction markedly occurs during the copolymerization, it becomes difficult to adjust the MI (melt index) of the crude oxymethylene copolymer to a desired level even by adding a molecular weight modifier.

With respect to the polymerization apparatus to be used for performing the above-mentioned copolymerization reaction, the polymerization apparatus may be either of a batch type or of a continuous type. As a batch type polymerization apparatus, a reaction vessel having a stirrer can generally be used. As a continuous type polymerization apparatus, a self-cleaning type mixer, such as a co-kneader, a twin-screw continuous extrusion kneader or a twin-paddle type continuous mixer, can be used.

In the method for producing a crude oxymethylene copolymer to be used in the method of the present invention, the polymerization can be conducted preferably at 60° to 200° C., more preferably 60° to 120° C., under atmospheric pressure. With respect to the polymerization time [which is defined as a time from the initiation of the polymerization (which is caused to occur by adding a polymerization catalyst to monomers including trioxane and a cyclic ether) to the deactivation of the polymerization catalyst in the resultant crude oxymethylene copolymer], it is varied depending on the amount of the polymerization catalyst, and there is no particular limitation thereon. However, in general, the polymerization time is preferably in the range of from 10 seconds to 100 minutes.

For obtaining a stabilized oxymethylene copolymer by stabilizing terminals of a crude oxymethylene copolymer by the method of the present invention, it is preferred that the crude oxymethylene copolymer obtained by the above-mentioned method of the copolymerization contain unstable terminals (having the group —$(OCH_2)_n$—OH in an amount of 3000 ppm by weight or less. When the crude oxymethylene copolymer obtained by the above-mentioned method of the copolymerization has an unstable terminal content of more than 3000 ppm by weight, it is difficult to obtain a stabilized copolymer by stabilizing terminals of the crude oxymethylene copolymer in accordance with the method of the present invention. In this connection, it should be noted that the unstable terminals of the crude oxymethylene copolymer are formed, during the polymerization, due to impurities (such as water, methanol and formic acid) which have active hydrogen (hydrogen of OH), which impurities are contained in raw materials, such as trioxane and a cyclic ether. Therefore, it is desired that the amount of these impurities be reduced to a level as low as possible by distillation, adsorption or the like.

Examples of methods for reducing the amount of active hydrogen-containing compounds by distillation include a method in which trioxane or a cyclic ether is subjected to distillation in the presence of benzene, thereby causing the benzene and active hydrogen-containing compounds to be azeotropically distilled off. Examples of methods for reducing the amount of active hydrogen-containing compounds by adsorption include a method in which trioxane or a cyclic ether is passed through a column having packed therein an adsorbent, such as zeolite, thereby adsorbing the active hydrogen-containing compounds on the adsorbent.

For producing a crude oxymethylene copolymer having an unstable terminal content of 3000 ppm by weight or less, it is desired that the total of active hydrogens (hydrogen of OH) in the impurities be 20 ppm by weight or less in terms of the amount of $H_2O$, based on the weight of the trioxane.

The obtained crude oxymethylene copolymer can be used in the method of the present invention immediately after the polymerization, by which unstable terminals of the crude copolymer are stabilized. Because the crude oxymethylene copolymer contains an active polymerization catalyst, it is preferred to deactivate the polymerization catalyst prior to the terminal stabilization reaction.

As a method for deactivating a polymerization catalyst, a method of deactivating the polymerization catalyst either in water containing a basic substance or in an organic solvent containing a basic substance can be used. Further, a method of deactivating a catalyst by adding a basic substance to a crude copolymer in a molten state in an extruder can be used. Examples of basic substances to be used for deactivating a polymerization catalyst include hydroxides, inorganic weak acid salts, and organic acid salts of alkali metals or alkaline earth metals. Of these, hydroxides, carbonates, phosphates, silicates, borates, formates, acetates, stearates, palmitates, propionates, oxalates and the like, of lithium, sodium, potassium, magnesium, calcium, strontium and barium are preferred. Further, ammonia and amine compounds, such as triethylamine and tributylamine, can be used as a catalyst deactivator.

With respect to the crude oxymethylene copolymer obtained by the above-mentioned copolymerization method, the removal of unreacted monomers can be conducted as follows. When an aqueous solution of a catalyst deactivator (such as triethylamine) is added to the crude copolymer, the resultant mixture is subjected to filtration to thereby separate the crude copolymer from unreacted monomers. In this case, if the crude copolymer contained in the reaction mixture is in a large bulk form, it is preferred that the crude copolymer be pulverized prior to the removal of unreacted monomers. On the other hand, when a catalyst deactivator as such (in non-solution form) is added to the resultant crude copolymer, followed by mixing while heating, the unreacted monomers are removed by evaporation by heating.

The thus obtained crude oxymethylene copolymer contains unstable terminals having the group —$(OCH_2)_n$—OH, which are easily decomposed by heating. By the method of the present invention, the unstable terminals of the crude oxymethylene copolymer are efficiently decomposed to obtain a stabilized oxymethylene copolymer.

As an apparatus for performing a terminal stabilization reaction by the method of the present invention, an extruder having one vent and at least two rotation shafts, i.e., a pair of shafts or three or more shafts, can be used. In the extruder provided with a pair of shafts, the two shafts may be rotated either in the same direction or in opposite directions. An extruder having a pair of shafts rotating in the same direction is preferably used in the method of the present invention.

FIG. 1 is a cross-sectional view showing the internal structure of one form of the extruder to be used as a terminal stabilization reaction apparatus in the method of the present invention.

The extruder to be used in the method of the present invention has supply inlet 4 for a crude oxymethylene copolymer, inlet 5 for a basic substance to be used for performing a terminal stabilization reaction, vent 7, and extrusion outlet 8 for a stabilized oxymethylene copolymer. The extruder comprises melting zone 1, terminal stabilization reaction zone 2 and volatile matter exhaustion zone 3 which are consecutively arranged in the extruder from the supply inlet toward the extrusion outlet. The rotation shaft (not shown) in the terminal stabilization reaction zone has a plurality of kneading elements in region 6 thereof to knead and agitate the copolymer in a molten state. Each of the zones is kept at a temperature of from the melting temperature of the crude oxymethylene copolymer to 265° C.

By the method of the present invention, the unstable terminals of a crude oxymethylene copolymer are stabilized using the above-mentioned extruder, to thereby produce a stabilized oxymethylene copolymer. The method comprises:

(1) feeding the crude oxymethylene copolymer to a supply inlet of the extruder, thereby melting the crude oxymethylene copolymer in the melting zone, (2) transporting the crude oxymethylene copolymer melted in the melting zone to the terminal stabilization reaction zone, and kneading and agitating the molten crude oxymethylene copolymer, in the presence of a basic substance capable of decomposing unstable terminals of the crude oxymethylene copolymer, in the terminal stabilization reaction zone, thereby performing a terminal stabilization reaction of the crude oxymethylene copolymer with the basic substance to thereby decompose the unstable terminals of the crude oxymethylene copolymer and produce a stabilized oxymethylene copolymer;

(3) transporting the stabilized oxymethylene copolymer to the volatile matter exhaustion zone to remove a generated gas of a volatile by-product; and (4) withdrawing the stabilized oxymethylene copolymer through the extrusion outlet therefor.

The above-mentioned extruder comprises a horizontally extending casing which has at least two rotation shafts extending longitudinally through the extruder, each rotation shaft comprising a first portion corresponding to the melting zone, a second portion corresponding to the terminal stabilization reaction zone, and a third portion corresponding to the volatile matter exhaustion zone.

In each of the rotation shafts of the extruder, the first portion has screw elements attached thereon in order to transport the crude oxymethylene copolymer in a molten form to the terminal stabilization reaction zone, and the second portion has kneading elements attached thereto which serve to knead and agitate the molten crude oxymethylene copolymer transported from the melting zone. The rotation shaft has a polygonal cross-section, and each of these elements has a hole in a central portion thereof, with which the rotation shaft is engaged, to thereby securely attach the elements to the rotation shaft. Needless to say, with respect to the method for securely attaching the elements to the rotation shaft, it is not limited to the above method.

In the extruder to be used in the method of the present invention, the elements of both rotation shafts are rotated while maintaining a slight clearance between the tip of the element of one rotation shaft and the tip of the corresponding element of the other rotation shaft, and between the tip of each of the elements and the inner wall of the casing, to thereby continuously, constantly renew the resin on the respective surfaces of the elements, so that a so-called self-cleaning ability is imparted to the extruder. The casing of the extruder has an inner diameter of from 20 to 300 mm, preferably from 20 to 200 mm.

In the present invention, the construction of kneading elements in the terminal stabilization reaction zone is important.

With respect to the terminal stabilization reaction zone of the extruder used in the method of the present invention, the internal pressure of the zone is elevated to a level which is from higher than 1 to 100 atm, preferably from 2 to 50 atm.

In order to maintain this pressure condition, a sealing member is securely attached to each rotation shaft in the same manner as in the case of the kneading element. The sealing member is provided between the melting zone and the terminal stabilization reaction zone, and may have a circular cross-section, so that the melting zone is separated from the terminal stabilization reaction zone, leaving a clearance between the periphery of the sealing member and the inner wall of the casing. A molten resin fills this clearance. The sealing member as mentioned above is also provided between the terminal stabilization reaction zone and the volatile matter exhaustion zone. Thus, by virtue of the above two sealing members, the desired pressure condition can be maintained.

In the extruder to be used in the method of the present invention, the second portion of each rotation shaft corresponding to the terminal stabilization reaction zone has a plurality of kneading elements arranged longitudinally on and securely attached to each rotation shaft in region 6 thereof having a specific length. The kneading elements can be attached on the above-mentioned second portion either continuously or discontinuously. The above-mentioned second portion in a region thereof having no kneading elements has screw elements attached thereto so as to transport the resin.

The length of the region having kneading elements in the second portion of each rotation shaft in the terminal stabilization reaction zone (when the kneading elements are arranged discontinuously, the sum of the respective lengths of the regions having the kneading elements) is from 2D to 15D, preferably 5D to 10D wherein D represents the inner diameter of the casing of the extruder. When the length is less than 2D, the crude oxymethylene copolymer and the basic substance are poorly kneaded, so that the degree of stabilization of the unstable terminals of the oxymethylene copolymer is unsatisfactory. A length of more than 15D is not advantageous because the main chain of the crude oxymethylene copolymer is likely to be cleaved during the kneading of the copolymer.

In the method of the present invention, kneading elements which have, for example, a quasipolygonal or convex lens-shaped cross-section taken along a plane perpendicular to the axis of the rotation shaft can be used. Preferably, kneading elements having a quasi-triangular or convex lens-shaped cross-section are used.

Figure 2:
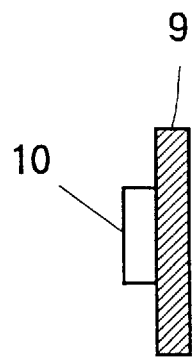
Figure 2:
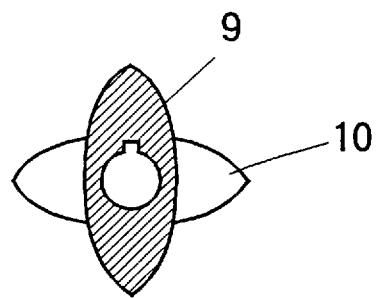

As the kneading element to be used in the present invention, a kneading element having two flat surfaces separated by a distance of the thickness of the kneading element is preferably used. Two or more of such kneading elements can also be combined into a block type kneading element and used. These kneading elements are arranged so that a respective kneading element is disposed, relative to the nearest kneading element which is longitudinally adjacent to the respective kneading element on a side remote from the extrusion outlet for the stabilized oxymethylene copolymer, at an angle of from 10° to 170°, preferably 30° to 1500° in a direction opposite to a rotation direction of the shaft. FIGS. 2(a) and (b) shows an angularly staggered relationship between kneading element 9 having a convex lens-shaped cross-section and kneading element 10 which is the nearest kneading element adjacent to kneading element 9 on a side of the extrusion outlet, in which kneading element 10 is disposed at an angle of 90° relative to kneading element 9.

Figure 3:
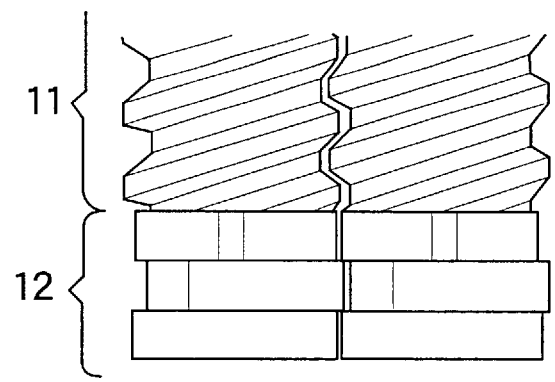
Figure 3:
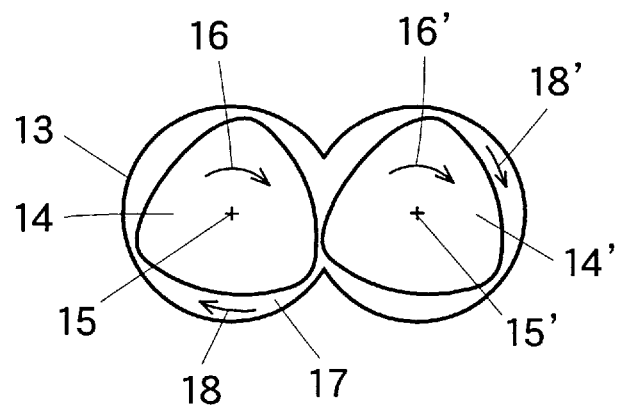
Figure 3:
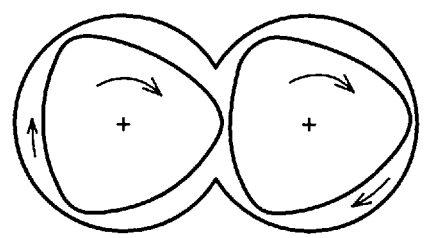
Figure 3:
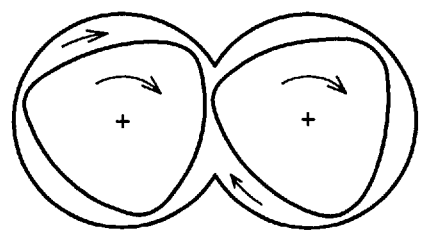

FIG. 3(a) is a diagrammatic, partial perspective view showing the arrangement of a set of kneading elements on each of a pair of rotation shafts rotating in the same direction in the casing of the extruder, wherein each kneading element has a quasi triangular cross-section taken along a plane perpendicular to the axis of the rotation shaft, and wherein the set of kneading elements is arranged in region 12 in adjacent relationship to a set of screw elements in region 11. FIGS. 3(b) to 3(d) is an explanatory diagram showing the rotation of a couple of kneading elements respectively attached to the pair of rotation shafts [the axes of the pair of rotation shafts are, respectively, designated with numerals 15 and 15' in FIGS. 3(b) to 3(d),] as shown in FIG. 3(a). In FIGS. 3(b) to 3(d), kneading elements 14 and 14' rotate in casing 13 of the extruder in directions 16 and 16', respectively. FIGS. 3(b) to 3(d) also show a crude oxymethylene copolymer 17 in a molten state which is kneaded and agitated by the couple of kneading elements in directions 18 and 18' in accordance with the rotation of rotation shafts.

Figure 4:
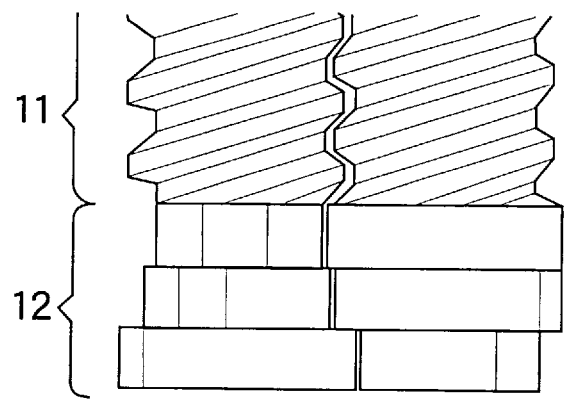
Figure 4:
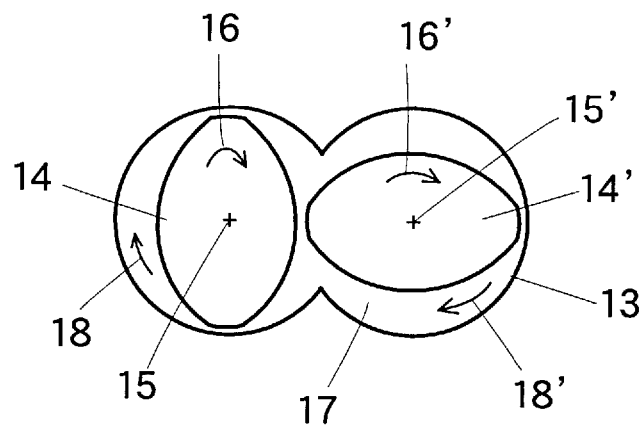
Figure 4:
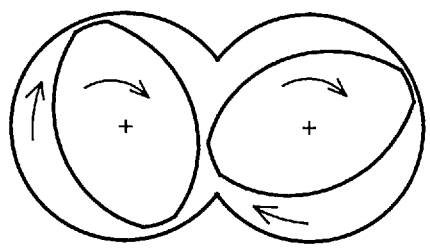
Figure 4:
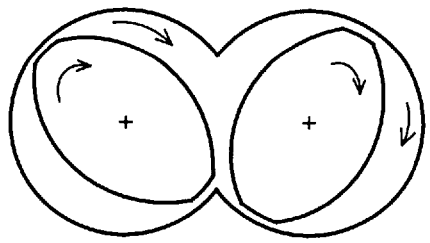

FIG. 4(a) is a diagrammatic, partial perspective view which is similar to FIG. 3(a), wherein each kneading element has a convex lens-shaped cross-section taken along a plane perpendicular to the axis of the rotation shaft. FIGS. 4(b) to 4(d) are explanatory diagrams similar to FIGS. 3(b) to 3(d), wherein each kneading element has a convex lens-shaped cross-section taken along a plane perpendicular to the axis of the rotation shaft.

With respect to each kneading element to be used in the method of the present invention, both surfaces of the kneading element are separated by a distance equal to a thickness of the kneading element of from 0.1D to 0.3D in which D is as defined above, and both surfaces of the kneading element are substantially perpendicular to a longitudinal axis of the rotation shaft. The thickness of the kneading element is preferably 0.1D to 0.2D. When the kneading element has a thickness of less than 0.1D, the strength of the kneading element is unsatisfactory, so that the apparatus is likely to be damaged. On the other hand, when the kneading element has a thickness of more than 0.3D, the crude oxymethylene copolymer and a basic substance are poorly kneaded, so that the obtained copolymer is not satisfactorily stabilized.

The temperature for the terminal stabilization reaction is from the melting temperature of the crude oxymethylene copolymer to 265° C., especially preferably from 190° to 230° C. When the temperature is higher than 265° C., the main chain of the copolymer is likely to be cleaved, leading to a lowering of the molecular weight of the obtained copolymer. Also the color tone of a pellet produced from the copolymer disadvantageously becomes poor.

Further, in the method of the present invention, the terminal stabilization reaction time is preferably 0.1 to 3 min.

With respect to the above-mentioned terminal stabilization reaction, explanation is made below in detail. The copolymer chains of the crude oxymethylene copolymer (which is subjected to terminal stabilization treatment) collectively have, as terminal groups, alkoxyl groups (such as methoxyl group), hydroxymethyl groups and formate groups (—OOCH).

The terminal alkoxyl groups are derived from a molecular weight modifier in the copolymerization. For example, methylal [$(CH_3O)_2CH_2$] is generally used as the molecular weight modifier. In this case, methoxyl groups are formed as terminal groups.

The terminal formate groups are formed by a hydride shift reaction which occurs as a side reaction during the copolymerization, as mentioned above.

The terminal hydroxymethyl groups (which are thermally unstable terminal groups) are formed during the production of the crude oxymethylene copolymer comprising recurring oxymethylene monomer units and oxyalkylene monomer units (which are derived from a cyclic ether) inserted therein, due to the presence of a small amount of water in raw materials for producing the crude oxymethylene copolymer. When the produced crude oxymethylene copolymer having the thermally unstable terminal hydroxymethyl groups is subjected to heat treatment in the presence of a basic substance, the unstable terminals (having terminal hydroxymethyl groups) of the copolymer chains are decomposed. This decomposition of the terminals of the copolymer chains proceeds toward the inner portion of the main chain of the copolymer comprising oxymethylene monomer units and oxyalkylene monomer units, and the decomposition terminates at a site where an oxyalkylene monomer unit is located, so that the oxyalkylene monomer unit at such a site is changed to a stable terminal group, such as hydroxyethyl group, hydroxybutyl group or the like. Thus, a stabilized oxymethylene copolymer as a final product can be obtained.

In the method of the present invention, the crude oxymethylene copolymer melted in the melting zone is transported to the terminal stabilization reaction zone where the molten crude oxymethylene copolymer is kneaded and agitated in the presence of a basic substance capable of decomposing unstable terminals of the crude oxymethylene copolymer, thereby performing a terminal stabilization reaction of the crude oxymethylene copolymer with the basic substance to decompose the unstable terminals of the crude oxymethylene copolymer.

Examples of basic substances usable in the present invention include ammonia and an aliphatic amine compound, such as triethylamine and tributylamine. Examples of basic substances other than the above-mentioned substances include hydroxides of alkali metals and alkaline earth metals, and salts of alkali metals and alkaline earth metals with inorganic weak acids or organic acids. Preferable examples of such basic substances include hydroxides of sodium, potassium, magnesium, calcium and barium, and carbonates, phosphates, silicates, borates, formates, acetates, stearates, palmitates, propionates and oxalates of the above types of metals. Of these, ammonia and an aliphatic amine compound, such as triethylamine and tributylamine, are especially preferred. The basic substance may be supplied to the extruder through an inlet for a basic substance provided at a portion of the extruder corresponding to the terminal stabilization reaction zone or through a supply inlet for a crude oxymethylene copolymer. For example, when ammonia is used as a basic substance, the basic substance can be supplied to the extruder in the form of an aqueous solution thereof through the inlet for a basic substance. When an aliphatic amine compound is used as a basic substance, the basic substance can be supplied to the extruder through the inlet for a basic substance in the form of a solution thereof in a solvent, such as water and/or an organic solvent. Alternatively, an aliphatic amine compound, and water and/or an organic solvent can be separately supplied to the extruder through the inlet for a basic substance. When hydroxides of alkali metals or alkaline earth metals, or salts of alkali metals or alkaline earth metals with inorganic weak acids or organic acids, are used as a basic substance, the basic substance which is in a powdery form can be supplied to the extruder through the supply inlet for a crude oxymethylene copolymer, or can be supplied in combination with water to the extruder through the inlet for a basic substance. In this case, when the basic substance is supplied to the extruder through the supply inlet for a crude oxymethylene copolymer, water can be supplied through the inlet for a basic substance.

When ammonia or an aliphatic amine compound is used as a basic substance, it is preferred that the basic substance be used in an amount of from 0.001 to 10% by weight, more preferably from 0.02 to 1% by weight, based on the weight of the crude oxymethylene copolymer. When hydroxides of alkali metals or alkaline earth metals, or salts of alkali metals or alkaline earth metals with inorganic weak acids or organic acids, are used as a basic substance, it is preferred that the basic substance be used in an amount of from 2 to 5000 ppm by weight, more preferably from 10 to 2000 ppm by weight.

Further, in the present invention, when the basic substance is used in combination with water and/or an organic solvent, it is preferred that the water and/or the organic solvent be used in an amount of from 0.01 to 10% by weight, based on the weight of the crude oxymethylene copolymer.

The stabilized oxymethylene copolymer obtained by the terminal stabilization reaction of the crude oxymethylene copolymer is transported to the volatile matter exhaustion zone to remove a generated gas of a volatile by-product. The extruder may be provided with one vent at a portion of the extruder which corresponds to the volatile matter exhaustion zone. When the crude oxymethylene copolymer has not been subjected to deactivation of catalyst prior to the terminal stabilization treatment, unreacted monomers (contained in the stabilized oxymethylene copolymer), formaldehyde (generated during the terminal stabilization reaction) and the like are removed in the volatile matter exhaustion zone at a temperature of from a melting temperature of the crude oxymethylene copolymer to 265° C. and under a reduced pressure of from 100 to 750 mmHg, and discharged from the vent. When a basic substance is used in combination with water and/or an organic solvent, the water and/or the organic solvent are also discharged from the vent.

Further, in the present invention, additives, such as a stabilizing agent for prevention of decomposition caused by exposure to heat or light, oxidation or the like, and other additives, e.g., an antistatic agent, a formic acid capturing agent, a mold-release agent, a lubricant, an organic filler and an inorganic filler, can be added to either a crude oxymethylene copolymer or a stabilized oxymethylene copolymer obtained therefrom. The amount of the additives can be such as are conventionally used in the art.

In the method of the present invention, the content of the unstable terminals in a crude oxymethylene copolymer can be reduced in a great extent so that the content of the unstable terminals in a stabilized oxymethylene copolymer becomes as small as 20 to 40 ppm by weight. Accordingly, by the method of the present invention, it becomes possible to obtain a stabilized oxymethylene copolymer which has not only excellent thermal stability, but also is advantageous in that a pellet produced therefrom is unlikely to suffer discoloration and that the stabilized oxymethylene copolymer is unlikely to generate an unpleasant smell of formaldehyde during the melt molding thereof.

BEST MODE FOR CARRYING OUT THE INVENTION

Hereinbelow, the present invention will be described in more detail with reference to the following Examples and Comparative Examples, but they should not be construed as limiting the scope of the present invention.

In the Examples and Comparative Examples, various measurements were conducted by the following methods to determine the following characteristics.

(1) Terminal stabilization reaction time:

A coloring tracer is added together with water and a basic substance (triethylamine) to a polymer which has been transported to a terminal stabilization reaction zone, and the period of time between the addition of the coloring tracer and a time point when the colored polymer is observed through the vent of the extruder is taken as a terminal stabilization reaction time.

(2) Unstable terminal content of a crude oxymethylene copolymer:

A crude oxymethylene copolymer is kept at 230° C. in an atmosphere of nitrogen gas for 40 minutes and while allowing formaldehyde generated from the oxymethylene copolymer to be absorbed in water. 50 ml of an aqueous 1.0 mol/liter sodium sulfite solution is added to the water containing the formaldehyde, and two or three drops of Thymol Blue as an indicator are added thereto. Then, the obtained blue mixture is subjected to titration by a method in which 1/100 N $H_2SO_4$ is added until the color of the mixture is changed from blue to colorlessness to thereby determine the amount of the formaldehyde. The amount of unstable terminals is determined, based on the amount of the formaldehyde.

(3) Unstable terminal content of a stabilized oxymethylene copolymer:

With respect to a stabilized oxymethylene copolymer obtained by subjecting a crude oxymethylene copolymer to terminal stabilization, the unstable terminal content is measured in the same manner as described in item (2) above.

(4) MI (melt index) of a stabilized oxymethylene copolymer:

The MI used herein means a melt index (g/10 min) as measured at 190° C. in accordance with ASTM D1238, and is evaluated as a characteristic value corresponding to a molecular weight. The lower the MI, the higher the molecular weight.

(5) Color tone of a pellet:

The color tone of a pellet of an oxymethylene copolymer is determined in terms of the "b" value by means of a color-difference meter (MODEL 1000DP manufactured and sold by Nippon Denshyoku Co., Japan), which "b" value is a characteristic value corresponding to a yellowness of the pellet. The larger the "b" value of a pellet, the higher the yellowness of the pellet.

EXAMPLE 1

A 5-liter kneader having two agitating blades and a jacket capable of circulating a heating medium was used. The internal temperature of the kneader was elevated to 80° C. under atmospheric pressure, and 3 kg of trioxane as a main monomer, 4.5 mol %, based on the amount of the trioxane, of 1,3-dioxolane as a comonomer, and $0.7 \times 10^{-3}$ mol of methylal as a molecular weight modifier were charged into and mixed in the kneader to thereby obtain a mixture. Boron trifluoride diethyl ether as a polymerization catalyst was added thereto in an amount such that the final concentration of boron trifluoride diethyl ether became $0.15 \times 10^{-4}$ mol per mol of the total of the trioxane and 1,3-dioxolane, and a polymerization reaction was conducted. Thirty (30) minutes after the start of the reaction, a heating medium at 30° C. was circulated through the jacket and 2 liters of an aqueous 1% triethylamine solution was added to the reaction mixture, and the reaction mixture was further agitated for 1 hour, thereby deactivating the catalyst. Then, the contents of the kneader were taken out and subjected to filtration and drying, thereby obtaining 2.7 kg of a crude oxymethylene copolymer. The obtained crude oxymethylene copolymer had an unstable terminal content of 960 ppm.

The crude oxymethylene copolymer was mixed with 0.3% by weight, based on the weight of the oxymethylene copolymer, of 2,2'-methylenebis-(4-methyl-6-t-butylphenol) and the resultant mixture was subjected to extrusion, using a twin-screw extruder as described below. The extruder has a supply inlet for a crude oxymethylene copolymer and an extrusion outlet for a stabilized oxymethylene copolymer, and a melting zone, a terminal stabilization reaction zone and a volatile matter exhaustion zone which are consecutively arranged in the extruder from the supply inlet toward the extrusion outlet. The extruder comprises a horizontally extending casing which has two rotation shafts extending longitudinally through the extruder, and each rotation shaft comprises a first portion corresponding to the melting zone, a second portion corresponding to the terminal stabilization reaction zone, and a third portion corresponding to the volatile matter exhaustion zone. The twin-screw extruder has a casing inner diameter of 30 mm and has one vent at a portion thereof corresponding to the volatile matter exhaustion zone. The terminal stabilization reaction zone of the extruder has a length of 20D wherein D represents the inner diameter of the casing of the extruder, and the second portion of each rotation shaft has, attached thereto, 30 kneading elements (each having a thickness of 0.1D in which D is as defined above) arranged in close relationship, so that the length of the region having the kneading elements in the terminal stabilization reaction zone is 3D in which D is as defined above. The kneading elements are arranged so that a respective kneading element is disposed in angularly staggered relationship, relative to the nearest kneading element which is longitudinally adjacent to the respective kneading element on a side remote from the extrusion outlet for the stabilized oxymethylene copolymer, at an angle of 90° in a direction opposite to a rotation direction of the shaft. The terminal stabilization reaction and volatile matter exhaustion were effected under conditions such that the internal temperature of the extruder was 200° C., that the amounts of water and triethylamine (as a basic substance) used for terminal stabilization were, respectively, 2% by weight and 1% by weight, based on the weight of the polymer, and that the degree of vacuum at the vent was 30 torr. The obtained stabilized oxymethylene copolymer was withdrawn from the outlet through the die of the extruder in the form of a strand, and pelletized.

Measurements were conducted with respect to the terminal stabilization reaction time, the unstable terminal content of the crude oxymethylene copolymer, the unstable terminal content of the stabilized oxymethylene copolymer, the MI of the stabilized oxymethylene copolymer and the color tone of a pellet.

Results are shown in Table 1.

EXAMPLES 2 to 6

Substantially the same procedure as in Example 1 was repeated except that the construction of kneading elements in the terminal stabilization reaction zone was varied as indicated in Table 1.

Results are shown in Table 1.

EXAMPLE 7

A crude oxymethylene copolymer was obtained in substantially the same manner as in Example 1 except that 1,4-butanediol formal was used as the comonomer instead of 1,3-dioxolane. Subsequently, a terminal stabilization of the crude oxymethylene copolymer was conducted in substantially the same manner as in Example 1 except that the construction of kneading elements in the terminal stabilization reaction zone was varied as indicated in Table 1.

Results are shown in Table 1.

Comparative Examples 1 to 3

Substantially the same procedure as in Example 1 was repeated except that the construction of kneading elements in the terminal stabilization reaction zone was varied as indicated in Table 2.

Results are shown in Table 2.

Comparative Example 4

Substantially the same procedure as in Example 1 was repeated except that the construction of kneading elements in the terminal stabilization reaction zone was changed as indicated in Table 2, and the internal temperature of the extruder was changed as indicated in Table 2.

Results are shown in Table 2.

TABLE 1

| Examples | Unstable terminal content of crude oxymethylene copolymer (ppm) | Length of terminal stabilization reaction zone (mm) | Construction of kneading elements in terminal stabilization reaction zone | | Length of region having kneading elements in the terminal stabilization reaction zone (mm) | Internal temperature of the extruder (°C.) | Terminal stabilization reaction time (min) | Unstable terminal content of stabilized oxymethylene copolymer (ppm) | MI (g/10 min) | Color tone of pellet (b value: yellowness) |
|---|---|---|---|---|---|---|---|---|---|---|
| | | | Thickness (mm) | Number of kneading elements | | | | | | |
| 1 | 960 | 20D* | 0.10D* | 30 | 3.0D* | 200 | 1.0 | 36 | 9.3 | −1.8 |
| 2 | 880 | 20D | 0.13D | 30 | 3.9D | 200 | 1.2 | 29 | 9.5 | −1.7 |
| 3 | 930 | 20D | 0.20D | 15 | 3.0D | 200 | 1.2 | 32 | 9.5 | −1.7 |
| 4 | 950 | 20D | 0.13D | 50 | 6.5D | 200 | 1.3 | 26 | 9.2 | −1.8 |
| 5 | 970 | 20D | 0.13D | 100 | 13D | 200 | 2.1 | 37 | 9.6 | −1.6 |
| 6 | 900 | 20D | 0.20D | 50 | 10D | 200 | 1.9 | 31 | 9.5 | −1.7 |
| 7 | 950 | 20D | 0.13D | 50 | 6.5D | 200 | 1.3 | 28 | 9.4 | −1.7 |

*D represents the inner diameter of the casing of the extruder

TABLE 2

| Comparative Examples | Unstable terminal content of crude oxymethylene copolymer (ppm) | Length of terminal stabilization reaction zone (mm) | Construction of kneading elements in terminal stabilization reaction zone | | Length of region having kneading elements in the terminal stabilization reaction zone (mm) | Internal temperature of the extruder (°C.) | Terminal stabilization reaction time (min) | Unstable terminal content of stabilized oxymethylene copolymer (ppm) | MI (g/10 min) | Color tone of pellet (b value: yellowness) |
|---|---|---|---|---|---|---|---|---|---|---|
| | | | Thickness (mm) | Number of kneading elements | | | | | | |
| 1 | 950 | 20D* | 0.10D* | 15 | 1.5D* | 200 | 0.8 | 230 | 9.3 | −1.8 |
| 2 | 890 | 20D | 0.20D | 85 | 17D | 200 | 2.1 | 128 | 10.1 | −1.4 |
| 3 | 980 | 20D | 0.35D | 20 | 7D | 200 | 1.2 | 310 | 9.7 | −1.3 |
| 4 | 920 | 20D | 0.13D | 50 | 6.5D | 270 | 1.2 | 630 | 15.8 | −0.4 |

*D represents the inner diameter of the casing of the extruder

INDUSTRIAL APPLICABILITY

By the method of the present invention, the terminal stabilization reaction of a crude oxymethylene copolymer can be efficiently performed to a substantially complete degree in a short period of time. Accordingly, a stabilized oxymethylene copolymer having a high thermal stability and suffering substantially no thermal decomposition or discoloration of the copolymer can be obtained in a commercially advantageous manner. Therefore, the commercial value of the method of the present invention is high.

We claim:

1. A method for stabilizing unstable terminals of a crude oxymethylene copolymer to produce a stabilized oxymethylene copolymer, which comprises:
   (1) feeding a crude oxymethylene copolymer, which is obtained by copolymerizing trioxane with a cyclic ether in the presence of a polymerization catalyst and which has an unstable terminal content of 3000 ppm by weight or less, to a supply inlet of an extruder comprising a melting zone, a terminal stabilization reaction zone and a volatile matter exhaustion zone which are consecutively arranged in said extruder from said supply inlet toward an extrusion outlet for a stabilized oxymethylene copolymer, said extruder having one vent at a portion thereof corresponding to said volatile matter exhaustion zone, each of said zones being kept at a temperature of from the melting temperature of the crude oxymethylene copolymer to 265° C., thereby melting said crude oxymethylene copolymer in said melting zone, said extruder comprising a horizontally extending casing which has at least two rotation shafts extending longitudinally through said extruder, each rotation shaft comprising a first portion corresponding to said melting zone, a second portion corresponding to said terminal stabilization reaction zone, and a third portion corresponding to said volatile matter exhaustion zone, (2) transporting said crude oxymethylene copolymer melted in said melting zone to said terminal stabilization reaction zone, and kneading and agitating the molten crude oxymethylene copolymer, in the presence of a basic substance capable of decomposing unstable terminals of the crude oxymethylene copolymer, in said terminal stabilization reaction zone corresponding to said second portion of each rotation shaft, said second portion of each rotation shaft having a plurality of kneading elements arranged longitudinally thereon and securely attached thereto in a region thereof having a length of from 2D to 15D wherein D represents the inner diameter of said casing of the extruder, each kneading element comprising two surfaces separated by a distance equal to a thickness of said kneading element, each of said two surfaces being substantially perpendicular to a longitudinal axis of said rotation shaft, wherein the thickness of said kneading element is from 0.1D to 0.3D in which D is as defined above, thereby performing a terminal stabilization reaction of said crude oxymethylene copolymer with said basic substance to thereby decompose the unstable terminals of said crude oxymethylene copolymer and produce a stabilized oxymethylene copolymer;

(3) transporting said stabilized oxymethylene copolymer to said volatile matter exhaustion zone to remove a generated gas of a volatile by-product; and (4) withdrawing said stabilized oxymethylene copolymer through said extrusion outlet therefor.

2. The method according to claim 1, wherein a terminal group —$(OCH_2)_n$—OH of said crude oxymethylene copolymer is decomposed in said terminal stabilization reaction zone.

3. The method according to claim 1, wherein said terminal stabilization reaction is performed for 0.1 to 3 minutes.

4. The method according to claim 1, wherein each of said kneading elements has a thickness of from 0.1D to 0.2D wherein D is as defined above.

5. The method according to claim 1, wherein said kneading elements are arranged so that a respective kneading element is disposed in angularly staggered relationship, relative to the nearest kneading element which is longitudinally adjacent to said respective kneading element on a side remote from said extrusion outlet for the stabilized oxymethylene copolymer, at an angle of from 10° to 170° in a direction opposite to a rotation direction of said shaft.

* * * * *